Dec. 8, 1964  N. B. WALES, JR  3,160,139
PET ANIMAL SHELTER
Filed March 13, 1963
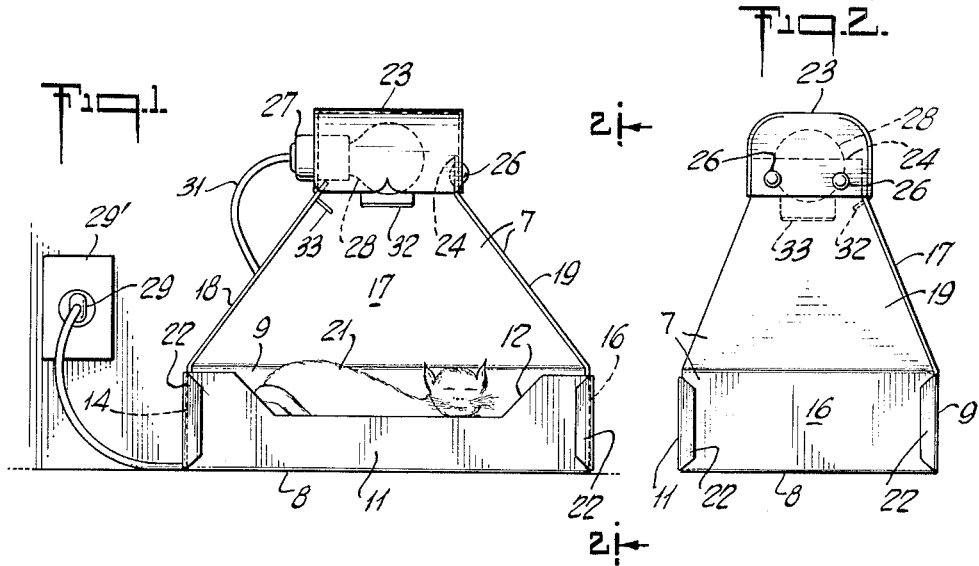
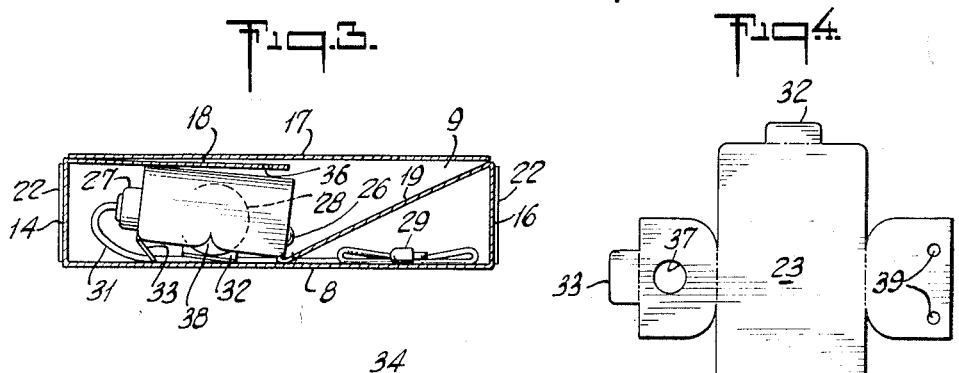
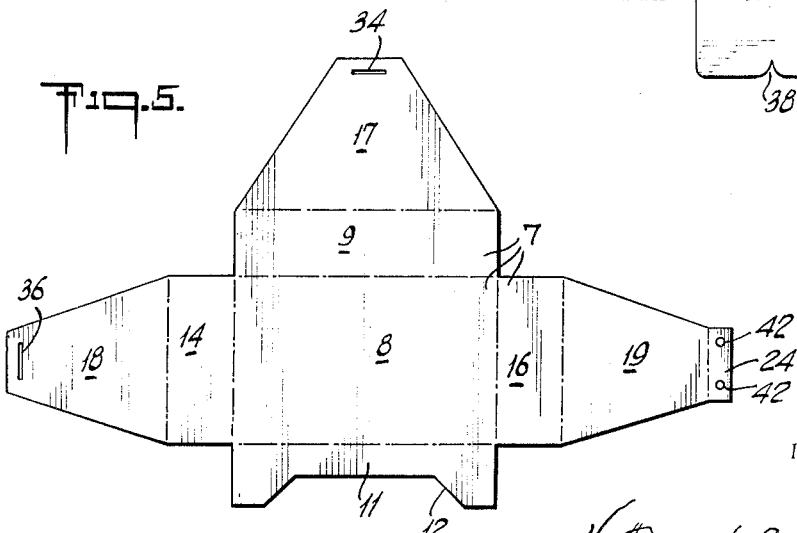
INVENTOR.
Nathaniel B. Wales Jr 3,160,139
PET ANIMAL SHELTER
Nathaniel B. Wales, Jr., Litchfield, Conn.
(66 E. 80th St., New York 21, N.Y.)
Filed Mar. 13, 1963, Ser. No. 264,868
1 Claim. (Cl. 119—1)

This invention relates to a shelter in which pet animals may bask under irradiation by radiant heat and light.

It has been observed that dogs and especially cats seek out locations to sleep which are sheltered and warm, and preferably exposed to radiant heat such as that from an incandescent lamp.

Based on this observation and a series of experiments, it has further been found that the average house pet prefers the level of light and heat radiation provided by a 75 watt incandescent bulb in winter, or a 60 watt bulb in warmer seasons, each located approximately sixteen inches directly above a resting surface.

The present invention incorporates these findings in a novel construction of a combination bed, shelter, and incandescent bulb and reflector support, which is termed a pet basker and which, besides being inexpensive to manufacture, has a geometry capable of easy assembly, and of collapsible folding for shipping purposes.

It is the principal object of this invention to provide an inexpensively manufactured shelter for pet animals which provides an integral source of radiant heat and light under which such animals can bask for their benefit and enjoyment.

Another object of the invention is to provide an irradiated pet shelter design in which the shelter is fabricated from a single die-cut sheet of a web, such as corrugated cardboard, which also forms the support for a reflector of radiant heat spaced above and directed downwardly on the floor of this shelter.

Still another object of the invention is to provide a shelter structure for pets which can be erected to form a pyramidal interlocking baffle wall and lamp support, while being capable of folding into a compact shipping package in which all the component parts are secured together for shipment.

For other objects and a clearer understanding of this invention reference is made to the following detailed specification to be taken in conjunction with the accompanying drawings, in which:

FIGURE 1 is a frontal view of a preferred form of the assembled shelter in use by a cat;

FIGURE 2 is a side view in elevation as seen from the plane 2—2 of FIGURE 1;

FIGURE 3 is a slightly enlarged cross sectional view in frontal elevation of the pet basker device of FIGURE 1 in its folded configuration showing the hinging action of the integral lamp socket and reflector;

FIGURE 4 is an evolved view of the preferably metal stamping from which the lamp reflector of FIGURE 1 is formed; and FIGURE 5 is an evolved reduced view of the die-cut pattern from which the shelter member of FIGURE 1 is formed.

Referring to FIGURES 1 and 2 it may be seen that the assembly pet basker device consists of a die-cut sheet 7, preferably of corrugated cardboard which is formed and folded to comprise a floor or base surface 8, a vertical rear wall 9, a front wall 11 having an entrance aperture 12, two vertical side walls 14 and 16, an inclined truncated pyramidal rear wall 17, and two inclined truncated pyramidal side walls 18 and 19.

The basker is shown occupied, FIGURE 1, by a cat 21, which has had access thereto by the aperture bounded by walls 11, 18, and 19.

The sides 9, 11, 14, and 16 have been secured together at the corners by adhesive strips 22 to form the open topped box comprising the base portion of the shelter.

A stamped metal reflector 23 is preferably secured to a hinged extension 24 of wall 19 by means of rivets 26. A socket 27 is secured to reflector 23 and engages an incandescent bulb 28, holding it centrally within reflector 23, so that light and radiant heat flux emanating therefrom will be directed downwardly toward floor 8.

Electric energization of bulb 28 is provided by line plug 29 and line cord 31 which may be connected to an electric supply outlet 29' as shown in FIGURE 1.

In the preferred form of the device, two tabs 32 and 33 are formed integrally with reflector 23 and located so that they may engage the slots 34 and 36 (FIGURE 5) which are formed in the top edges of walls 17 and 18 respectively. Tabs 32 and 33 are bent inward at approximately 45° to engage slots 34 and 36 more securely.

In FIGURE 4, which is the evolved metal blank from which reflector 23 is formed by bending along the dotted lines, a hole 37 is provided through which the socket 27 is mounted. The orthogonal relation of tabs 32 and 33 may also be seen in FIGURE 4. The decorative indentation 38 is provided to introduce a draped appearance. Holes 39 in reflector 23 are provided for rivets 26 which secure reflector 23 in hinged relation to inclined wall 19 of shelter 7 by passing through holes 42 (FIGURE 5) in a hinged tab 41 which forms an extension of wall panel 19.

The dotted lines in the evolved view of the shelter 7, shown in FIGURE 5, represent scored bending or hinge lines along which appropriate bending forms the geometry shown in FIGURES 1, 2, and 3. Due to the finite radius of curvature at the dotted bending lines, the three walls supporting reflector 23 may be described as inwardly inclined shelter surfaces secured to three sides of the rectangular base surface 8.

In the folded configuration of FIGURE 3 the basker occupies a reduced volume for shipping purposes. Due to the fact that all the components are secured together in folded relation there can be no appreciable relative motion of the parts in shipment, thereby assuring protection from the acceleration and shocks characteristic of the shipping process.

In addition, this folded arrangement permits little ambiguity in the erection of the shelter after receipt by the user, thereby simplifying the use of this invention by minimizing the assembly instructions required.

The inward curvatures of tabs 32 and 33 tend to afford a secure retention thereof by slots 34 and 36, respectively. It is also to be noted that the weight of reflector 23 and line cord 31 also tend to maintain the engagement of tabs 32 and 33 with slots 34 and 36 due to the location of socket 27 on the side of reflector 23 remote from hinge tab 24.

Since many modifications and changes may be made by those skilled in the art in the disclosed form of the invention, it is to be understood that the spirit and scope of the invention is defined in the following claim.

I claim:

A pet shelter comprising a base, four relatively shallow intgeral vertical walls hinged thereto, means connecting the ends of said vertical walls, one of said vertical walls having a cut away top portion, three pyramidal walls, one integrally hinged to each of the other of said vertical walls, the tops of said pyramidal walls being truncated to form a top opening, and one of said pyramidal walls having a hinged integral vertical extension having openings therein at its top, and the others of said pyramidal walls having transverse slots adjacent their tops, an arcuate metal reflector having integral end portions, one of said end portions having openings therein aligned with the openings in said vertical extension, rivets extended through said aligned openings securing said reflector over said top opening, tabs on the other of said integral end portions and on one side of said reflector engaging in said transverse slots holding said pyramidal side walls in related assembly, said other of said integral end portions having a central opening therein, a socket in said opening, a cord adapted to connect said socket to a source of electricity, and an incandescent bulb in said socket.

References Cited in the file of this patent

UNITED STATES PATENTS

| | | |
|---|---|---|
| 2,280,779 | Barragy | Apr. 28, 1942 |
| 2,287,635 | Nolte | June 23, 1942 |
| 2,493,589 | McCaskell | Jan. 3, 1950 |